(12) United States Patent
Akamatsu et al.

(10) Patent No.: US 10,248,904 B2
(45) Date of Patent: Apr. 2, 2019

(54) RF TAG

(71) Applicant: TOYO SEIKAN GROUP HOLDINGS, LTD., Tokyo (JP)

(72) Inventors: Shinya Akamatsu, Kanagawa (JP); Hironaga Shimizu, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/788,109

(22) Filed: Oct. 19, 2017

(65) Prior Publication Data

US 2018/0039878 A1    Feb. 8, 2018

Related U.S. Application Data

(63) Continuation of application No. PCT/JP2016/001968, filed on Apr. 11, 2016.

(30) Foreign Application Priority Data

Apr. 21, 2015  (JP) .................. 2015-086857

(51) Int. Cl.
*H01Q 1/24*      (2006.01)
*G06K 19/077*    (2006.01)
*H01Q 19/22*     (2006.01)
*H01Q 5/30*      (2015.01)

(52) U.S. Cl.
CPC ..... *G06K 19/07775* (2013.01); *G06K 19/077* (2013.01); *G06K 19/0779* (2013.01); *G06K 19/07794* (2013.01); *H01Q 1/24* (2013.01); *H01Q 5/30* (2015.01); *H01Q 19/22* (2013.01)

(58) Field of Classification Search
CPC ............. H01Q 5/30; H01Q 1/24; H01Q 19/22

USPC ......................................................... 343/873
See application file for complete search history.

(56) References Cited

U.S. PATENT DOCUMENTS

| | | |
|---|---|---|
| 2006/0032926 A1 | 2/2006 | Baba et al. |
| 2007/0229276 A1 | 10/2007 | Yamagajo et al. |
| 2008/0122630 A1 | 5/2008 | Baba et al. |
| 2010/0032487 A1 | 2/2010 | Bohn et al. |
| 2011/0121080 A1 | 5/2011 | Kai et al. |
| 2011/0279326 A1 | 11/2011 | Dokai et al. |

(Continued)

FOREIGN PATENT DOCUMENTS

| | | |
|---|---|---|
| JP | 2006-053833 A | 2/2006 |
| JP | 2007-272264 A | 10/2007 |

(Continued)

OTHER PUBLICATIONS

Extended European Search Report issued in European Application No. 16782777.3; dated Nov. 21, 2018 (8 pages).

(Continued)

*Primary Examiner* — Andrea Lindgren Baltzell
(74) *Attorney, Agent, or Firm* — Osha Liang LLP

(57) ABSTRACT

An RF tag that includes an inlay (made of an IC chip and an antenna); an auxiliary antenna laminated on the inlay in an insulated state; and a housing that houses the inlay having the auxiliary antenna laminated thereon. Furthermore, the antenna of the inlay forms a loop circuit adjacent to the IC chip, and the auxiliary antenna overlaps part of the loop circuit and is arranged along a longitudinal direction of the inlay such that at least a part of the antenna of the inlay is exposed.

8 Claims, 10 Drawing Sheets

(56) References Cited

U.S. PATENT DOCUMENTS

2012/0068826 A1* 3/2012 Kim ................ G06K 19/07786
340/10.1
2015/0108222 A1* 4/2015 Shimizu ................ H01Q 1/38
235/488

FOREIGN PATENT DOCUMENTS

| JP | 2009-182446 A | 8/2009 |
| JP | 2010-508794 A | 3/2010 |
| JP | 2011-109552 A | 6/2011 |
| JP | 2013-114513 A | 6/2013 |
| JP | 2013-250797 A | 12/2013 |
| JP | 2014-006810 A | 1/2014 |
| WO | 2007/139205 A1 | 12/2007 |

OTHER PUBLICATIONS

International Search Report issued in International Application No. PCT/JP2016/001968; dated Jun. 28, 2016 (3 pages).
International Preliminary Report on Patentability issued in International Application No. PCT/JP2016/001968; dated Nov. 2, 2017 (11 pages).

* cited by examiner

RF TAG

TECHNICAL FIELD

One or more embodiments of the present invention relate to an RF tag which is attached to articles or objects, (e.g., electric meters and freight containers, and more particularly, to an RF tag further having an auxiliary antenna laminated on an inlay including an IC chip and an antenna).

BACKGROUND

In general, for each of arbitrary articles and objects, there is widely used a so-called RF tag which incorporates an IC chip to store predetermined information concerning the articles and objects in a readable and writable manner. The RF tag is also called an RFID (radio frequency identification) tag, an IC tag, a contactless tag or the like, and is a micromini communication terminal provided by forming, into a tag (a label) shape, a so-called inlay (an inlet) which has an electronic circuit including an IC chip and a wireless antennal sealed by or coated with a base material such as a resin film. Thus, the communication terminal is configured to wirelessly enable a read-only operation, a write-once operation and a read/write operation of predetermined information from/to the IC chip in the tag by using a reader/writer.

Afterward, the RF tag including the predetermined information is attached to each of the arbitrary articles and objects, the information recorded in the RF tag is picked up by the reader/writer, and then the information recorded in the tag can be recognized, output, displayed and updated as the predetermined information concerning each of the attached articles and the like.

Such an RF tag enables recording data of hundreds of bits to kilos of bits in a memory of the IC chip, and thus a sufficient information amount of the information can be recorded as the information concerning each of the articles and the like. In addition, since communication can be performed In a contactless manner on the reader/writer side, there are not worries about abrasion of a contact, scratches, contamination and the like, and moreover, since a power supply to the tag itself is unnecessary, the tag can be processed, miniaturized and thinned in conformity to a shape and size of the objects to be used.

When such an RF tag is used, there can be recorded various pieces of information concerning each of the articles to which the tag is attached, e.g., a name, an identification symbol, contents, components, an administrator, a user, or a use state and a use situation of the article. Thus, the various pieces of information of such a great amount as to be impossible by characters and a barcode printed and displayed on a label surface can be correctly read or written by only attaching the miniaturized/thinned tag to each of the articles.

Furthermore, in such an RF tag, when an auxiliary antenna is further laminated on a general-purpose inlay constituting the tag, a wireless communication distance of the general-purpose inlay can be increased, or wireless communication can be performed in an arbitrary frequency band, if desired.

Here, in a case where the auxiliary antenna formed of a metal thin film or the like is laminated on the general purpose inlay having an IC chip and an antenna coated only with a film, the above inlay in this state easily receives influences of impact, moisture, a change in temperature and the like, so that a failure, a malfunction, fracture and the like will be caused.

As a cope with the defect, if the auxiliary antenna is laminated on the general-purpose inlay in such a manner, the laminated inlay and the auxiliary antenna are covered with a predetermined cover, or housed in a housing, whereby the inlay and the auxiliary antenna can be protected from the external environment.

For example, in Patent Literature 1, the present applicant suggests a technology which can protect a general-purpose inlay and an auxiliary antenna from the surrounding environment and maintain/improve weather resistance or heat resistance/waterproof properties of an RF tag by laminating the auxiliary antenna on the general-purpose antenna and housing/sealing them in a resin housing in this state.

CITATION LIST

Patent Literature

Patent Literature 1: Japanese Unexamined Patent Application Publication No. 2014-006810

In the technology suggested in Patent Literature 1, a configuration where the auxiliary antenna is laminated on an entire surface (an upper surface) of the general-purpose inlay is adopted in terms of assuring a given communication distance. Thus, an antenna previously included in the inlay is entirely covered with the auxiliary antenna, and hence the antenna of the inlay itself does not function as an antenna.

SUMMARY

In one or more embodiments, the present application is for an RF tag which enables both the antenna (included in the inlay) and the auxiliary antenna (laminated on the inlay) to effectively function aside from the technology suggested in Patent Literature 1.

That is, one or more embodiments of the present invention is related to the RF tag which enables both the antenna of the inlay and the auxiliary antenna to effectively function while protecting them from the external environment by laminating the auxiliary antenna on the inlay including an IC chip and the antenna and housing them in a predetermined housing or the like.

In one or more embodiments, an RF tag of the present invention may comprise an inlay comprising an IC chip and an antenna, an auxiliary antenna laminated on the inlay in an insulated state, and a housing which houses the inlay having the auxiliary antenna laminated thereon, wherein the antenna of the inlay forms a loop circuit near the IC chip, and the auxiliary antenna is arranged, being overlapped on a part of the loop circuit, and arranged along a longitudinal direction of the inlay in such a manner that at least a part of the antenna of the inlay is exposed.

According one or more embodiments of the present invention, the auxiliary antenna is laminated on the inlay including the IC chip and the antenna and these members are housed in a predetermined housing or the like so that they can be protected from the external environment, both the antenna of the inlay and the auxiliary antenna can effectively function, and wireless communication over, e.g., a plurality of different frequency bands is enabled.

Thus, according to one or more embodiments of the present invention, it is possible to realize the RF tag which is particularly suitable for an electric meter by which communication characteristics of the RF tag can be easily affected or a freight container which is used over different countries or regions having different frequency bands which can be used as communication frequencies of the RF tag.

BRIEF DESCRIPTION OF DRAWINGS

FIG. 1A shows a state seen from a housing plane side and FIG. 1B shows a state seen from a housing bottom surface side;

FIG. 5A shows the inlay, FIG. 5B shows the auxiliary antenna, and FIG. 5C shows a state where the auxiliary antenna is overlapped and laminated on a part of a loop circuit of the inlay;

FIG. 8A shows the inlay, FIG. 86 shows the auxiliary antenna, and FIG. 8C, FIG. 8D, and FIG. 8E are plan views showing examples of different modes of mounting/laminating the inlay and the auxiliary antenna depicted in FIG. 8A and FIG. 8B on the dielectric constant adjusting plate, FIG. BC shows a case where both ends of the auxiliary antenna in the longitudinal direction are protruded from the dielectric constant adjusting plate as folded portions, FIG. 8D and FIG. 8E show cases where one of the end portions of the auxiliary antenna in the longitudinal direction is protruded;

FIG. 9A shows a case where both the end portions of the auxiliary antenna linearly formed along a longitudinal direction are bent along a direction crossing the longitudinal direction and FIG. 9B shows a case where both the end portions of the auxiliary antenna which are bent and formed in the direction crossing the longitudinal direction are bent along the longitudinal direction; FIG. 10A shows an example of the RF tag including the inlay and the auxiliary antenna which are not partially cut shown in FIGS. 5A to 5C, FIGS. 6A to 6E, FIG. 10B and FIG. 10C show examples of the RF tag including the partially cut inlay and auxiliary antenna shown in FIGS. 8A to 8E.

DETAILED DESCRIPTION OF EMBODIMENTS

One or more embodiments of an RF tag according to the present invention will now be described hereinafter with reference to the drawings and the particular embodiments therein.

Figure 1A:
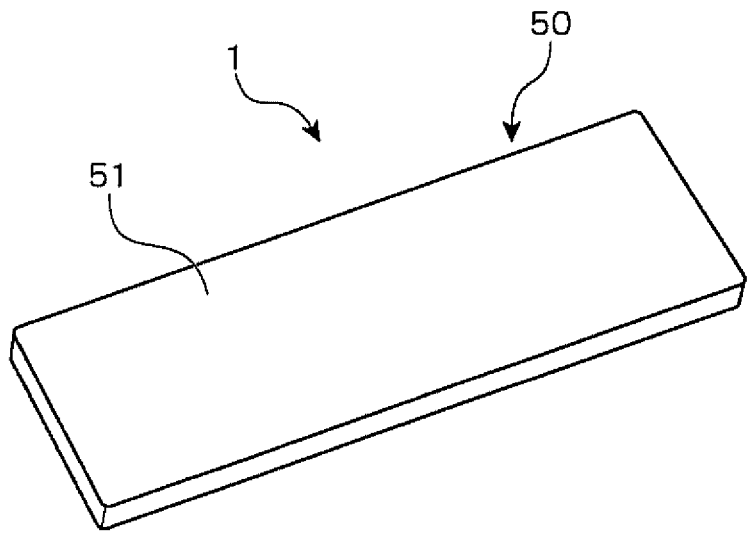
FIGS. 1A and 1B are perspective views each showing an RF tag according to one or more embodiments of the present invention in a completed state where an inlay is housed in a housing, where
Figure 1B:
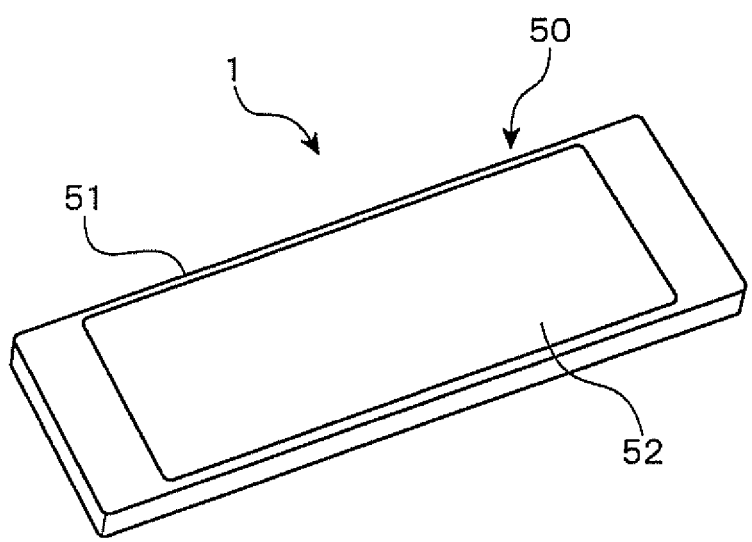

FIGS. 1A and 1B are perspective views showing an RF tag according to one or more embodiments of the present invention in a completed state where an inlay is housed in a housing, and FIG. 2 and FIGS. 3A to 3D are exploded perspective views of the RF tag according to one or more embodiments of the present invention.

Figure 4:
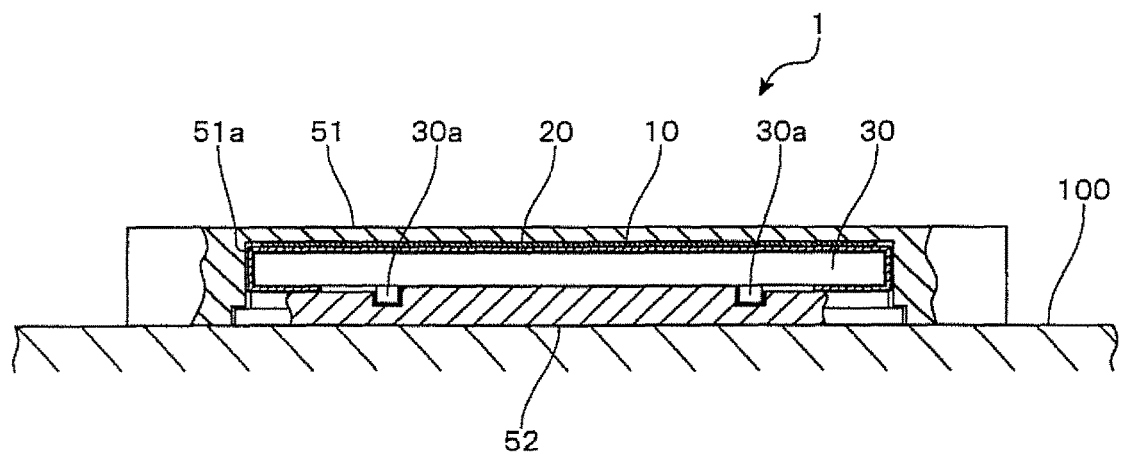
FIG. 4 is a partially cutaway front view showing the RF tag according to one or more embodiments of the present invention.

Further, FIG. 4 is a partially cutaway front view of the RF tag according to one or more embodiments of the present invention.

Figure 5A:
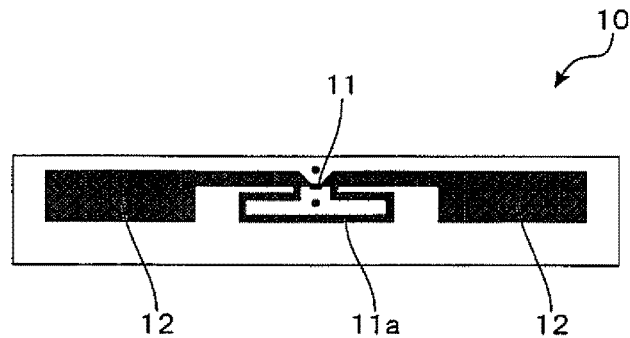
FIGS. 5A to 5C are plan views showing the inlay and the auxiliary antenna of the RF tag according to one or more embodiments of the present invention, where
Figure 5B:
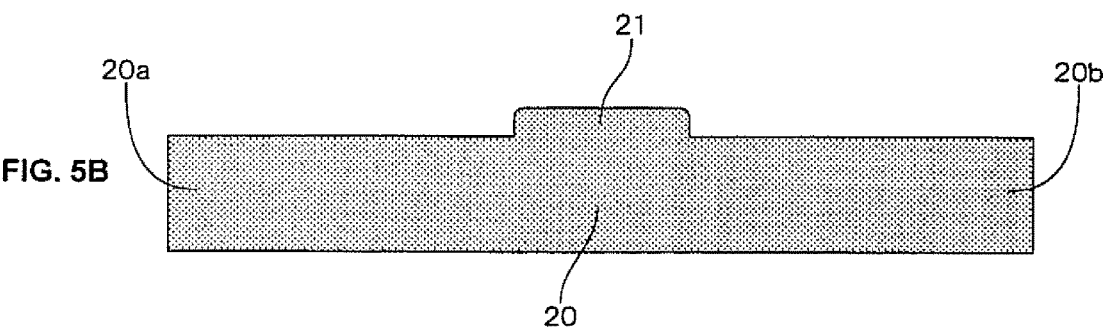
Figure 5C:
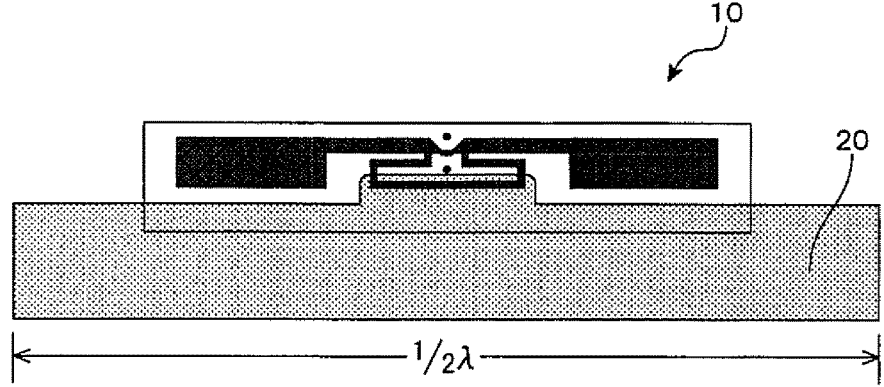

Furthermore, FIGS. 5A to 5C are plan views showing the inlay and an auxiliary antenna of the RF tag according to one or more embodiments of the present invention, where FIG. 5A shows the inlay, FIG. 5B shows the auxiliary antenna, and FIG. 5C shows a state where the auxiliary antenna is overlapped and laminated on a part of a loop circuit of the inlay.

As shown in these drawings, an RF tag 1 according to this embodiment is an RF tag having a configuration where an inlay 10 constituting the RF tag which performs wireless communication is housed in a housing 50 and protected, and protecting the inlay 10 by the housing 50 enhances weather resistance, heat resistance/waterproof properties, and the like.

Figure 2:
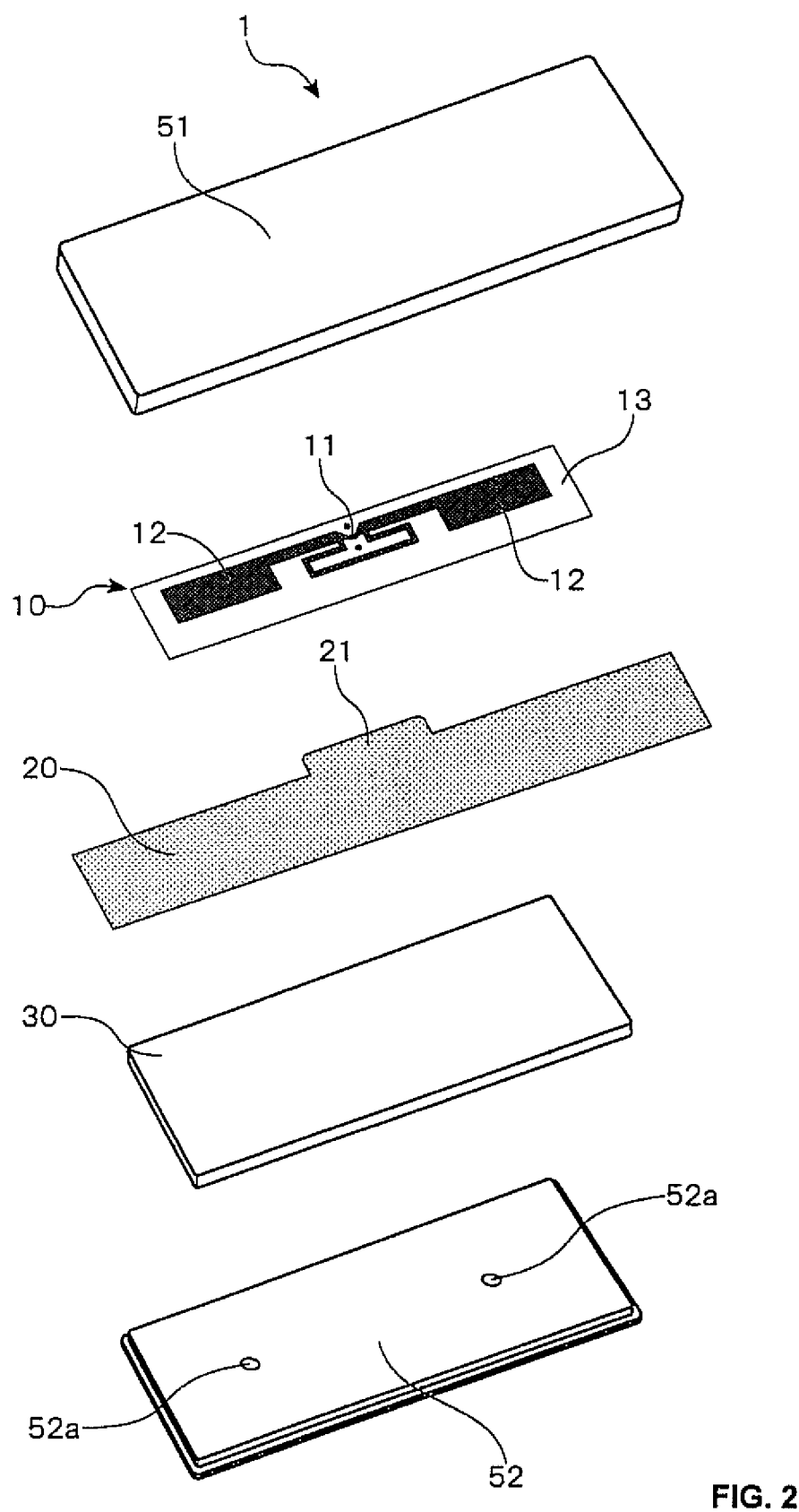
FIG. 2 is a perspective view of a state where the housing, the inlay, an auxiliary antenna, and a dielectric constant adjusting plate of the RF tag shown in FIG. 1A are all disassembled, and shows a state seen from the housing plane side in correspondence with FIG. 1A.
Figure 3A:
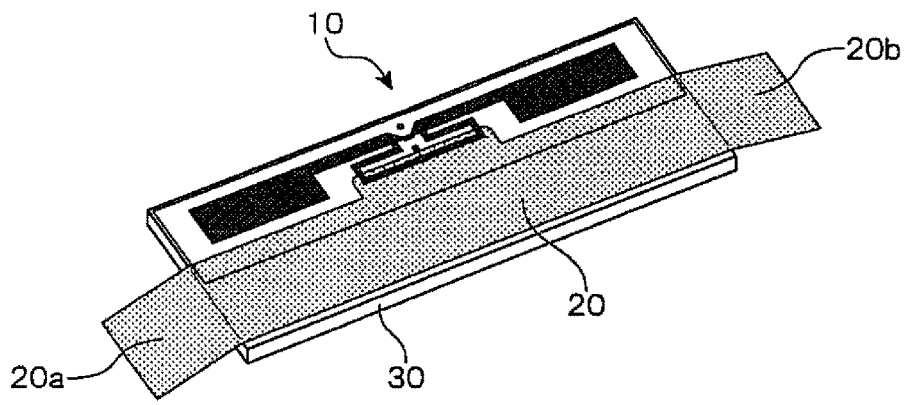
FIGS. 3A to 3C are perspective views showing a procedure of mounting/laminating the inlay and the auxiliary antenna of the RF tag shown in FIG. 2 on the dielectric constant adjusting plate.
Figure 3B:
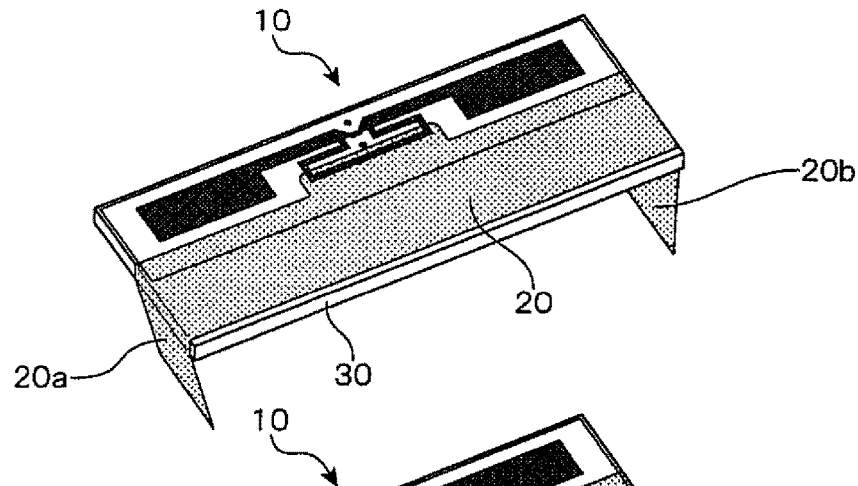
Figure 3C:
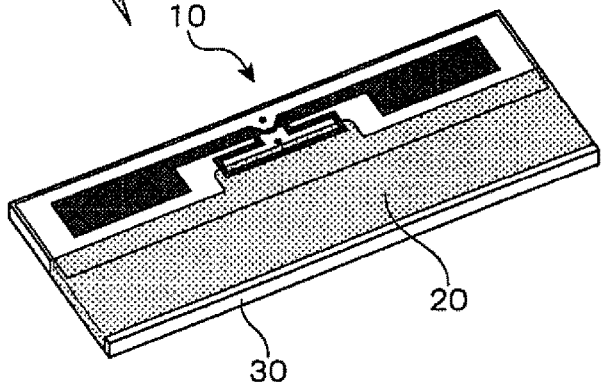
Figure 3D:
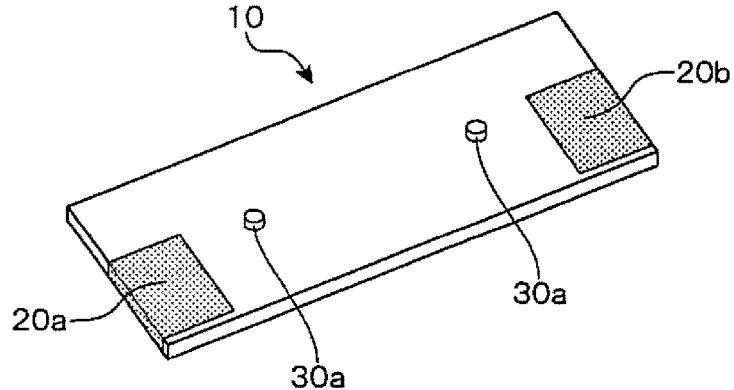
FIG. 3D is a perspective view showing the dielectric constant adjusting plate having the inlay and the auxiliary antenna depicted in FIG. 3C laminated thereon.

Specifically, as shown in FIG. 2, the RF tag 1 according to one or more embodiments may include the inlay 10 provided with an IC chip 11 and an antenna 12, a planar auxiliary antenna 20 laminated on the inlay 10 in an insulated state, a dielectric constant adjusting plate 30 which serves as a base on which the inlay 10 having the auxiliary antenna 20 laminated thereon is mounted and also functions as a dielectric constant adjusting layer to the inlay mounted thereon, and the housing 50 which houses the dielectric constant adjusting plate 30 on which the inlay 10 having the auxiliary antenna 20 laminated thereon is mounted. It is to be noted that the auxiliary antenna 20 and the inlay 10 are mounted/laminated on an upper surface of the dielectric constant adjusting plate 30 in the mentioned order in this embodiment, but the inlay 10 may be mounted on the dielectric constant adjusting plate 30 and then the auxiliary antenna 20 may be laminated on an upper surface of the inlay 10.

Moreover, in the RF tag 1 according to this embodiment, the antenna 12 of the inlay 10 forms a loop circuit (a loop part 11a) near the IC chip 11, the auxiliary antenna 20 is overlapped and arranged on a part of the loop circuit and arranged along a longitudinal direction of the inlay 10 so that at least a part of the antenna 12 of the inlay 10 is exposed.

Additionally, a length of the auxiliary antenna 20 in the longitudinal direction is increased beyond a length of the inlay 10 in the longitudinal direction, and at least one of end portions of the auxiliary antenna 20 in the longitudinal direction longer than the inlay 10 is bent to a back surface side of the inlay 10 on which the auxiliary antenna 20 is laminated.

Each portion will now be described hereinafter in detail.

[Inlay]

The inlay 10 constitutes the RF tag which enables a read-only operation, a write-only operation, and a read/write operation of predetermined information in a wireless manner with a non-illustrated reader/writer (a reading/writing device), and there are, e.g., a read-only type, a write-once type, and a read/write type.

Specifically, as shown in FIG. 2 and FIG. 5A, the inlay 10 has the IC chip 11 and the antenna 12 which is electrically conductive/connected with the IC chip 11, and the IC chip 11 and the antenna 12 are mounted and formed on one sealing film 13 made of, e.g., a PET resin functioning as a base material, then another sealing film 13 is overlapped, and the IC chip 11 and the antenna 12 are sealed/protected in a state where they are held between the two sealing films 13.

In this embodiment, there is used the rectangular inlay 10 which comprises the IC chip 11, the antennas 12 extending on both sides of the IC chip 11, and the rectangular sealing film 13 to hold and seal the IC chip 11 and the antennas 12.

The IC chip 11 is formed of a semiconductor chip of a memory or the like and can record data of, e.g., hundreds of bits to kilos of bits.

A loop-like circuit conductor is connected to the IC chip 11 to surround a chip periphery, the loop part 11a is thereby formed, and the antenna 12 is connected to both left and right sides of the IC chip 11 through this loop part 11a.

Further, a read/write operation (data calling, registration, deletion, updating, and the like) from/to the non-illustrated reader/writer through this antenna 12 and the later-described auxiliary antenna 20 is performed by the wireless communication, and data recorded In the IC chip 11 is recognized.

As the data recorded in the IC chip 11, arbitrary data such as an identification code, a name, a weight, contents, a manufacturer/seller name, a manufacturing site, a manufacturing date, an expiration date, and the like of a commercial product can be recorded and rewritten.

The antenna 12 is formed by, e.g., etching a conductive ink film or a metal thin film such as an aluminum-metallized film having conductive properties into a predetermined shape/dimension (a length and an area), on a surface of one sealing film 13 as a base material.

It is possible that the sealing film 13 is made of a film material having flexibility such as polyethylene, polyethylene terephthalate (PET), polypropylene, polyimide, polyvinyl chloride (PVC), or an acrylonitrile-butadiene-styrene resin (ABS) and the IC chip 11/antenna 12 to be sealed is made of, e.g., a transparent PET resin which can be visually confirmed from the outside. Furthermore, an adhesive layer/bonding layer can be provided on one film surface of the sealing film 13 to enable attachment to the base material or each of articles.

As a communication frequency band used by the inlay 10, for example, a band of 860 M to 960 MHz which belongs to a so-called UHF band can be covered.

As frequency bands generally used by the RF tag, there are several types of frequency bands, e.g., a band of 135 kHz or less, a band of 13.56 MHz, a band of 860 M to 960 MHz belonging to the UHF band, and a band of 2.45 GHz. Thus, a communication distance which enables the wireless communication differs depending on a frequency band to be used, and an optimum antenna length or a wiring pattern differs depending on a frequency band.

In this embodiment, since the inlay 10 can be miniaturized and the later-described auxiliary antenna 20 is provided, the UHF band which has a short wavelength and enables miniaturization of the antenna, e.g., the 860 MHz band or the 920 MHz can be covered, and the excellent communication characteristics can be provided in these frequency bands.

However, if there is no, e.g., a size restriction of the inlay 10 or the auxiliary antenna 20, technical ideas themselves according to the present invention are not restricted to a specific frequency band, and can be applied to, e.g., arbitrary frequency bands other than the UHF band as a matter of course.

[Auxiliary Antenna]

The auxiliary antenna 20 functions as an antenna to improve/adjust the communication characteristics of the inlay 10, and it is formed of a planar conductive member which is laminated on one surface side (a bottom surface side in this embodiment) of the inlay 10 as shown in FIG. 2, FIGS. 3A to 3D and FIG. 5B, and insulated from the inlay 10 resin-sealed by the sealing films 13.

That is, the entire inlay 10 is resin-sealed by the sealing films 13, and physically insulated from the auxiliary antenna 20 formed of the conductive member. Furthermore, when such an auxiliary antenna 20 is directly laminated on the inlay 10, the auxiliary antenna 20 and the IC chip 11 of the inlay 10 are arranged to face each other through the sealing film 13 and electrically connected by a so-called capacitor coupling.

Consequently, the auxiliary antenna 20 is laminated in a lengthwise direction (a height direction) on the inlay 10, a two-dimensional antenna is thereby constituted of the antenna 12 of the inlay 10 and the auxiliary antenna 20, the auxiliary antenna 20 functions as a booster for communication radio waves, and the communication characteristics of the inlay 10 are adjusted/improved.

Here, the auxiliary antenna 20 can be formed by, e.g., forming a metal thin film having conductive properties into a predetermined shape/size (a length and an area) by punching and cutting processing or the like using a Thomson blade. Moreover, the auxiliary antenna 20 can be also formed by etching, pattern printing, and the like.

Additionally, in this embodiment, as shown in FIG. 2, FIGS. 3A to 3D and FIG. 5C, such an auxiliary antenna 20 is overlapped and arranged on a part of the loop part 11a (the loop circuit) of the inlay 10, and it is formed into a rectangular plane shape which extends in the longitudinal direction like the inlay 10 in such a manner that at least a part of the other portion of the antenna 12 of the inlay is exposed and the antenna 12 is arranged along the longitudinal direction of the inlay 10.

FIG. 5C shows an example of a state where the auxiliary antenna 20 is overlapped and laminated on a part of the loop part 11a of the inlay 10.

When the auxiliary antenna 20 is first overlapped and arranged on the loop part 11a of the inlay 10 in this manner, impedance matching can be achieved between the inlay 10 and the auxiliary antenna 20.

Although the loop circuit is formed (the loop part 11a) in the vicinity of the IC chip 11 of the inlay 10, this loop part 11a is intended to achieve the impedance matching and provided to perform communication using a magnetic field component, and this magnetic field component must be prevented from being inhibited by the conductor of the auxiliary antenna 20.

Thus, in this embodiment, as shown in FIG. 5C, at the time of overlapping and laminating the auxiliary antenna 20 on the inlay 10, the auxiliary antenna 20 is overlapped and arranged on only a part of the loop part 11a to prevent the impedance matching from being inhibited by the conductive member constituting the auxiliary antenna 20 for the loop part 11a of the inlay 10.

On the other hand, as shown in FIG. 5C, the auxiliary antenna 20 is arranged along the longitudinal direction of the inlay 10 to be substantially parallel to the antenna 12 in such a manner that the antenna 12 of the inlay 10 is extensively exposed except the portion which is overlapped the loop part 11a. When the antenna 12 of the inlay 10 is extensively exposed in this manner, the antenna 12 of the inlay 10 itself can function as the antenna of the RF tag 1 separately from the auxiliary antenna 20.

Consequently, two antennas, i.e., the antenna 12 of the inlay 10 and the auxiliary antenna 20 can function, and the RF tag 1 can perform the wireless communication over, e.g., different frequency bands by using the antenna 12 of the inlay 10 and the auxiliary antenna 20.

Further, in this embodiment, as shown in FIG. 5C, a length of the auxiliary antenna 20 in the longitudinal direction is formed beyond a length of the inlay 10 in the longitudinal direction.

Furthermore, as shown in FIGS. 3A to 3D, at least one of end portions of the auxiliary antenna 20 in the longitudinal direction longer than the inlay 10 is bent to a back surface side of the inlay 10 on which the auxiliary antenna 20 is laminated.

Here, communication characteristics of the auxiliary antenna 20 formed of the metal thin film are improved as its antenna length is increased. Thus, it is possible to form the length of the auxiliary antenna 20 in the longitudinal direction to be a length which is substantially a ½ wavelength of a communication radio wave.

On the other hand, when an entire length of the RF tag 1 is set to, e.g., the ½ wavelength of the communication radio wave in accordance with the length of the auxiliary antenna 20, a dimension is too long (too large), which is not preferable in terms of properties of the RF tag which must be reduced in size.

Thus, in this embodiment, a length of a long side of the auxiliary antenna 20 is first formed to be a length which is substantially ½ of a wavelength of a radio wave frequency used in the wireless communication as shown in FIG. 5C.

Here, "substantially ½" corresponds to not only being precisely "½ (0.5)" of the wavelength of the radio frequency but also being substantially "½" and, for example, even a range (0.4 to 0.6) which is ±20% of the ½ wavelength or the like corresponds to "substantially ½" according to the present invention.

Further, at least one of the end portions of the auxiliary antenna 20 in the longitudinal direction longer than the inlay 10, i.e., both the end portions or one end portion in the longitudinal direction is bent to the back surface side of the inlay 10 on which the auxiliary antenna 20 is laminated as shown in FIGS. 3A to 3D and FIG. 4.

In the example shown in FIGS. 3A to 3D and FIG. 4, in a state where the inlay 10 and the auxiliary antenna 20 are laminated on the dielectric constant adjusting plate 30 serving as the base, both end portions 20a and 20b of the auxiliary antenna 20 are arranged to equally protrude from both ends of the dielectric constant adjusting plate 30 in the longitudinal direction, and both the protruding end portions 20a and 20b are bent to the back surface side of the dielectric constant adjusting plate 30.

With this arrangement the excellent communication characteristics can be provided by forming the auxiliary antenna 20 to have a length which is substantially the ½ wavelength in correspondence with the communication radio wave of the inlay 10, and the length of the RF tag 1 can be set to a length substantially equal to, e.g., the inlay 10 serving as a core by bending the end portions of the auxiliary antenna 20, and hence it is possible to cope with a demand for miniaturization of the RF tag 1.

The dielectric constant adjusting plate on which the inlay and the auxiliary antenna are laminated produces a wavelength reducing effect, and an apparent wavelength is reduced by using this plate. Its dielectric constant is approximately "2 to 4". Thus, the length of the long side of the auxiliary antenna 20 in this embodiment is an approximate value, a value which is substantially λ/2 can suffice, and the length slightly varies in correspondence with a material of the housing 50 of the RF tag 1, a use environment of the tag, a use mode, and the like in some situations.

A specific length or shape, arrangement, a bending method, and others of the auxiliary antenna 20 will be described later with reference to FIGS. 5 to 9 and the like.

It is to be noted that a current which flows through the auxiliary antenna 20 when data is read/written from/into the inlay 10 flows through a peripheral portion of the planar auxiliary antenna 20 alone (a skin effect).

Thus, although not shown, when the auxiliary antenna 20 has a rectangular/planar peripheral outer shape extending in the longitudinal direction, the planar portion can be formed into, e.g., a mesh (retiform) shape, a lattice shape, or the like.

When the auxiliary antenna 20 is formed into the mesh shape in this manner, the skin effect can prevent the function as the antenna from being impaired, an area of the entire conductor portion of the auxiliary antenna 20 can be reduced, the conductor material such as a conductive ink forming the auxiliary antenna 20 can be cut down, and costs of the RF tag 1 can be further reduced.

[Housing/Dielectric Constant Adjusting Plate]

The housing 50 is protecting means for protecting the inlay 10 by housing the inlay 10 therein, and the dielectric constant adjusting plate 30 having the inlay 10 mounted thereon can be detachably housed in the housing 50.

When the inlay 10 is protected by this housing 50, the weather resistance, the heat resistance/waterproof properties and the like of an RF tag can be enhanced.

Specifically, as shown in FIGS. 1 to 4, the housing 50 is entirely formed into a rectangular parallelepiped shape which includes a housing main body 51 including a concave portion 51a (see FIG. 4) serving as a space which immovably houses the dielectric constant adjusting plate 30 on which the inlay 10 having the auxiliary antenna 20 laminated thereon is mounted, and a lid portion 52 which lids and closes/hermetically seals an opening portion of the concave portion 51a of the housing main body 51.

It is to be noted that a shape/structure or the like of the outer shape of the housing 50 can be changed as long as the dielectric constant adjusting plate 30 on which the inlay 10 having the auxiliary antenna 20 laminated thereon is mounted can be housed, and the outer shape of the housing 50 can be appropriately designed/changed in conformity to, e.g., a structure or a size of each of articles article which use the RF tag 1, a use state of the tag, and the like.

The dielectric constant adjusting plate 30 serves as the base on which the inlay 10 having the auxiliary antenna 20 laminated thereon is mounted and also functions as a dielectric constant adjusting layer to the inlay 10 mounted thereon, and it is formed of a tabular member which detachably and immovably engages with the concave portion 51a of the housing main body 51 and is housed in the housing 50. Specifically, as shown in FIG. 2 and FIGS. 3A to 3D, the dielectric constant adjusting plate 30 is formed into a rectangular/tabular shape which has substantially the same length as that of the inlay 10 laminated thereon and has a width which enables mounting the inlay 10 and the auxiliary antenna 20 thereon in a state where they are aligned along the longitudinal direction.

Further, when both the end portions 20a and 20b of the auxiliary antenna 20 in the longitudinal direction are arranged to equally protrude from both the ends of this dielectric constant adjusting plate 30 in the longitudinal direction, as shown in FIGS. 3A to 3D, both the protruding end portions 20a and 20b of the auxiliary antenna 20 are folded to the back surface side of the dielectric constant adjusting plate 30 as they are.

This dielectric constant adjusting plate 30 is engaged with the concave portion 51a of the housing main body 51 and immovably held, and the inlay 10 and the auxiliary antenna 20 are housed/held in the housing.

The lid portion 52 is a tabular lid member which is fitted to the opening portion of the concave portion 51a in/with which the dielectric constant adjusting plate 30 is housed/ engaged, and seals the entire opening of the concave portion 51a.

In this embodiment, the concave portion 51a of the housing main body 51 has a depth which enables housing the entire dielectric constant adjusting plate 30 on which the inlay 10 having the auxiliary antenna 20 with the bent end portions laminated thereon is mounted, and also has a depth which enables perfectly fitting the lid portion 52 in a state where it is overlapped the dielectric constant adjusting plate 30 (see FIG. 4).

Furthermore, the concave portion 51a has a step portion formed along an opening edge portion thereof and, on the other hand, the lid portion 52 has a flange-like step portion formed along its peripheral portion thereof, and they are formed in such a manner that the lid portion 52 which has sealed the concave portion 51a becomes substantially level with (so-called flushness) with a back surface of the housing main body 51 when the step portions of the concave portion 51a and the lid portion 52 abut on/are fitted to each other (see FIG. 1B and FIG. 4)

The lid portion 52 which has been fitted in/has sealed the opening of the concave portion 51a is bonded to the housing main body 51 by, e.g., ultrasonic welding, heat fusion, or an adhesive, and the housing 50 is hermetically closed/sealed from the outside.

Moreover, in a state where the housing main body 51 is hermetically closed with the lid portion 52, the housing 50 is attached to each of articles/objects which use the RF tag 1 via, e.g., an adhesive or screwing, or installed/fitted at a predetermined position of the corresponding article/object.

Additionally, convex portions 30a and hole portions 52a, which have a concave-convex structure in which they engage with each other in a state where the dielectric constant adjustment plate 30 and the lid portion 52 are housed in/engaged with the concave portion 51a, can be provided at corresponding positions on the dielectric constant adjusting plate 30 and the lid portion 52.

In this embodiment, as shown in FIGS. 2 to 4, the convex portions 30a and 30a are formed on the dielectric constant adjusting plate 30 side and the hole portions 52a and 52a are formed on the lid portion 52 side at two positions along a central line in the longitudinal direction on respective surfaces of the dielectric constant adjusting plate 30 and the lid portion 52 facing each other.

When the convex portions 30a and the hole portions 52a are engaged with each other, the dielectric constant adjusting plate 30 is positioned at a predetermined position in the concave portion 51a and held by the lid portion 52, and it can be securely and firmly held/housed in the housing 50 (see FIG. 4).

Here, as materials forming the housing 50 and the dielectric constant adjusting plate 30, there are, e.g., a thermoplastic resin such as a polycarbonate resin, an acrylonitrile-ethylene-styrene (AES) resin, a polypropylene resin, a polyethylene resin, a polystyrene resin, an acrylic resin, a polyester resin, a polyphenylene sulfide resin, an acrylonitrile-butadiene-styrene (ABS) resin, a polyvinyl chloride resin, a polyurethane resin, a fluorine resin, or a silicone resin, and a resin material such as a thermoplastic elastomer.

In this embodiment, the housing 50 including the dielectric constant adjusting plate 30 is formed by using a weatherproofing AES resin or a weatherproofing polycarbonate resin in particular since such a material is superior in the weather resistance, heat resistance, water resistance, and the like and facilitates, e.g., later-described forming or processing of the dielectric constant adjusting plate 30 in correspondence with the communication characteristics of the inlay 10.

Further, it is possible to form the housing main body 51 and the lid portion 52, which constitute the housing 50 made of the above-described resin material, by using the same resin material.

As described above, the housing main body 51 and the lid portion 52 are joined by means, e.g., ultrasonic welding after the closing the opening of the concave portion 51 with the lid portion 52.

Thus, when the housing main body 51 and the lid portion 52 are made of the same resin material, both the members can be more securely and firmly joined in case of joining them by fusion or bonding.

However, the housing main body 51 and the lid portion 52 can be made of different materials as long as they can be joined/sealed.

Furthermore, the above-described dielectric constant adjusting plate 30 can be formed into a shape which provides a predetermined dielectric constant to adjust the communication characteristics of the inlay 10 having the auxiliary antenna 20 laminated thereon, whereby the dielectric constant adjusting plate 30 can function as a dielectric constant adjusting layer to the inlay 10 mounted/laminated on the dielectric constant adjusting plate 30.

For example, the dielectric constant adjusting plate 30 can be formed with a predetermined thickness, and one or more through portions (through holes) which are pierced in the dielectric constant adjusting plate 30 can be provided at predetermined positions on a mounting surface of this plate on which the inlay 10 is mounted.

When the through portions are formed in this manner, the dielectric constant adjusting plate 30 enables partially arranging a dielectric substance to the inlay 10 mounted thereon.

Consequently, when the through portions are appropriately formed in the dielectric constant adjusting plate 30 while considering a type or communication characteristics of the inlay 10 to be used, a material of the housing 50 or the dielectric constant adjusting plate 30, and various conditions such as each of articles which use the RF tag 1, a use environment an available frequency band, and the like, the RF tag 1 can be used for different articles or configured to cope with different communication frequencies by selecting/replacing the dielectric constant adjusting plate 30 alone.

For example, although not shown in particular, a rectangular through portion which is a size larger than a width (a length of a lateral direction) of the inlay 10 is formed at a position corresponding to the IC chip 11 and the loop part 11a of the inlay 10 at a substantial center of the dielectric constant adjusting plate 30, or different through portions are formed at corresponding positions on both sides of this central through portion.

Positions, shapes, sizes, quantities, and the like of the through portions formed in such a dielectric constant adjusting plate 30 can be designed/changed while counting/considering a type of a resin material constituting the dielectric constant adjusting plate 30 or the housing 50, communication characteristics or a communication frequency of the inlay 10, and conditions such as each of articles which use the RF tag 1, a use environment, a use area, and the like.

Specifically, for example, positions, shapes, sizes, quantities, and the like of the holes of the through portions formed in the dielectric constant adjusting plate 30 differ depending on a case where both the housing 50 (the housing main body 51 and the lid portion 52) and the dielectric constant adjusting plate 30 are made of the weatherproofing AES resin and a case where both the housing 50 (the housing main body 51 and the lid portion 52) and the dielectric constant adjusting plate 30 are made of the weatherproofing polycarbonate resin.

Furthermore, in this embodiment, only the resin materials which constitute the housing 50 (the housing main body 51 and the lid portion 52) and the dielectric constant adjusting plate 30 are different, but these members may have the same structure/shape/dimension.

Moreover, as shown in FIG. 2, the dielectric constant adjusting plate 30 may be formed into a perfect tabular shape having no hole and the like without forming the above-described through portions. According to such a dielectric constant adjusting plate 30, the dielectric constant adjusting layer (the dielectric constant adjusting plate 30) having a predetermined dielectric constant is arranged on one entire surface side of the inlay 10, whereby the inlay 10 can be designed to provide the excellent communication characteristics.

As described above, the dielectric constant adjusting plate 30 can be appropriately designed/changed in correspondence with a resin material constituting the dielectric constant adjusting plate 30 or the housing 50, the communication characteristics of the inlay 10, each of articles which use the RF tag 1, a use situation, and the like, and the through portions may be appropriately provided, or such through portions can be eliminated.

Thus, in terms of easiness of designing/adjusting the dielectric constant adjusting plate 30 including formation of the through portions, stability of the communication characteristics, and the like, it is possible to form the dielectric constant adjusting plate 30 by using the same material as the housing main body 51 and the lid portion 52.

In a case where optimum communication characteristics of the RF tag 1 can be provided, the dielectric constant adjusting plate 30 can be formed by using a resin material which is different from that of the housing main body 51 and the lid portion 52.

[Lamination Pattern of Inlay/Auxiliary Antenna]

A specific lamination pattern of the auxiliary antenna 20 on the antenna 12 of the inlay 10 of the RF tag 1 according to this embodiment having the above structure will now be described with reference to FIGS. 5 to 7 and the like.

First, as shown in FIG. 5C, in this embodiment, as a basic configuration, the auxiliary antenna 20 is overlapped and arranged on a part of the loop part 11a (the loop circuit) of the inlay 10, and arranged along the longitudinal direction of the inlay 10 so that the other portion of the antenna 12 of the inlay 10 is extensively exposed.

Additionally, the length of the auxiliary antenna 20 in the longitudinal direction is set to become substantially a ½ wavelength of the communication radio wave.

Specifically, in the example shown in FIGS. 5A to 5C, the auxiliary antenna 20 is linearly formed along the longitudinal direction longer than the inlay 10, and a protruding portion 21 which is overlapped a lower end edge of the loop part 11a in the longitudinal direction placed at the center of the inlay 10 is extended to protrude toward the inlay 10 side at a substantial center of the auxiliary antenna 20.

According to such an auxiliary antenna 20, an upper end edge of the protruding portion 21 is overlapped the lower end edge of the loop part 11a of the inlay 10, and the auxiliary antenna 20 and the inlay 10 can be arranged so that they do not overlap at any other part.

Consequently, the antenna 12 of the inlay 10 is extensively exposed without laminating the auxiliary antenna 20 except the lower end edge of the loop part 11a, and the antenna 12 of the inlay 10 itself can function as the antenna of the RF tag 1 separately from the auxiliary antenna 20.

Figure 10A:
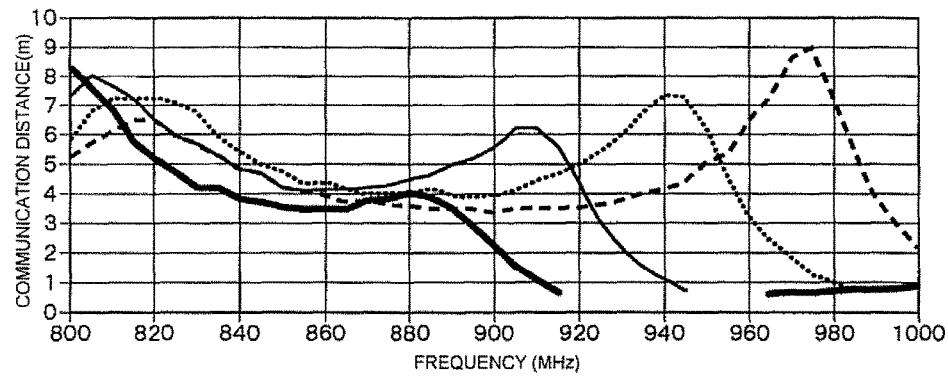
FIGS. 10A to 10C are line charts showing communication characteristics of the RF tag according to one or more embodiments of the present invention and showing a relationship between a communication distance and a frequency, where
Figure 10B:
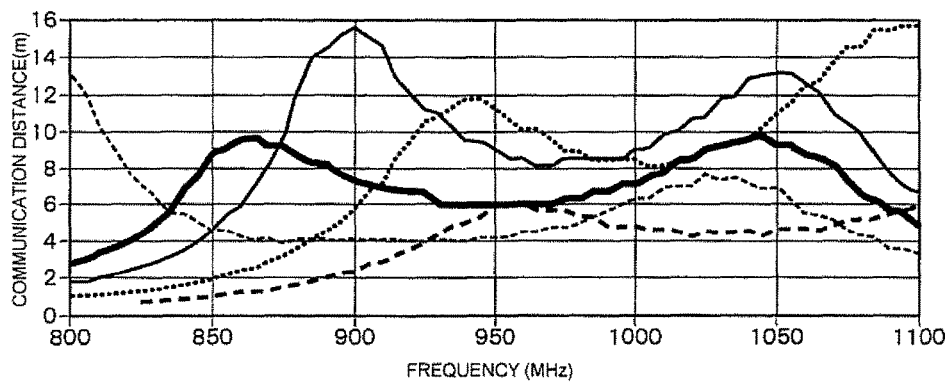
Figure 10C:
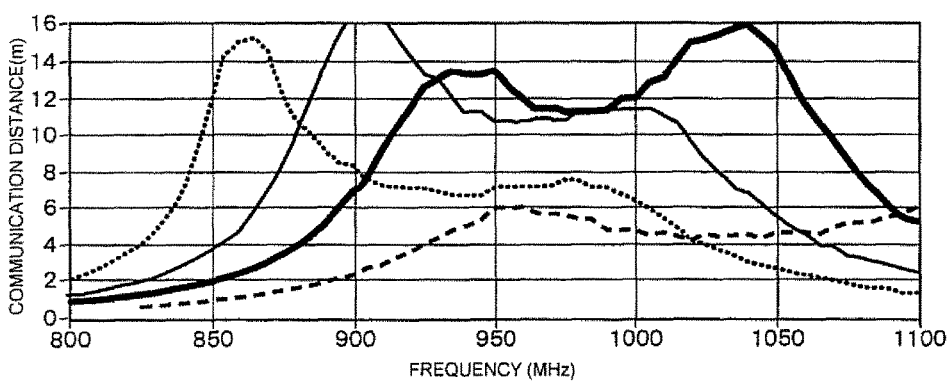

Thus, the two antennas, i.e., the antenna 12 of the inlay 10 and the auxiliary antenna 20 can be used as antennas which enable performing the wireless communication over different frequency bands (see FIGS. 10A to 10C).

Here, as the planar shape of the auxiliary antenna 20, for example, such an auxiliary antenna 20 as shown in FIGS. 6A to 6E can be adopted in correspondence with characteristics or a communication frequency of the inlay 10 without being restricted to a mode shown in FIGS. 5A to 5C.

FIGS. 6A to 6E are plan views showing examples of auxiliary antennas having different shapes according to one or more embodiments of the present invention, respectively.

In each of the auxiliary antennas 20 shown in FIGS. 6A to 6E, a total length in the longitudinal direction is set to become substantially a ½ wavelength of a communication radio wave.

Figure 6A:
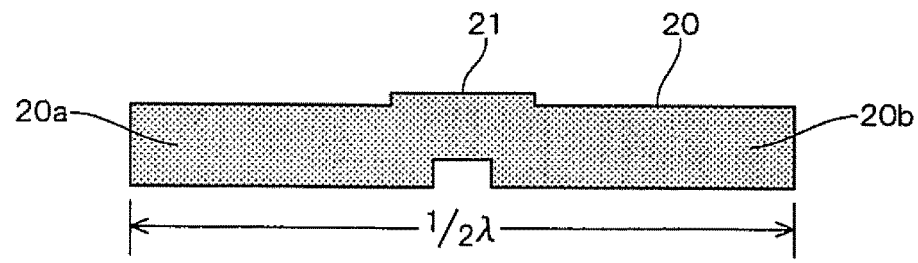
FIGS. 6A to 6E are plan views showing examples where the auxiliary antenna according to one or more embodiments of the present invention is formed into different shapes, respectively.

In the auxiliary antenna 20 shown in FIG. 6A, a concave-shaped notch is provided at a center of an edge portion (a lower edge) facing a protruding portion 21 as different from the auxiliary antenna 20 shown in FIGS. 5A to 5C.

Figure 6B:
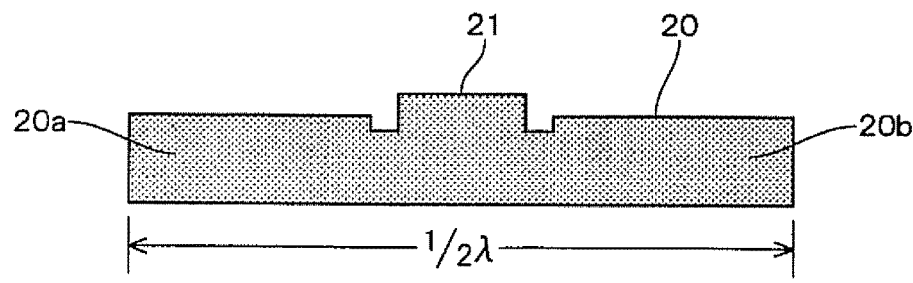

Further, in the auxiliary antenna 20 shown in FIG. 6B, concave-shaped notches are provided on both sides of a protruding portion 21 as different from the auxiliary antenna 20 shown in FIGS. 5A to 5C.

In this manner, when the concave portions or notches are provided near the central portion of the auxiliary antenna 20, impedance matching to the loop part 11a of the inlay 10 can be adjusted, and the further appropriate/optimum auxiliary antenna 20 can be realized in correspondence with characteristics or a communication frequency of the inlay 10.

Figure 6C:
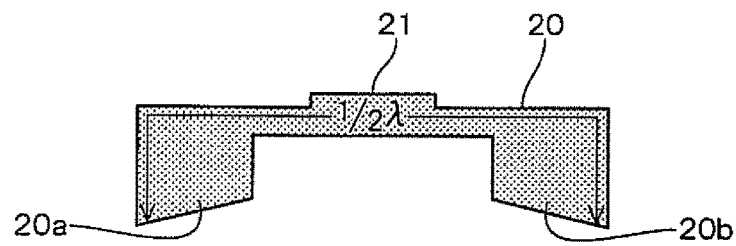

Furthermore, in the auxiliary antenna 20 shown in FIG. 6C, both end portions 20a and 20b of the auxiliary antenna 20 in the longitudinal direction longer than the inlay are extended in a direction (downward) crossing the longitudinal direction of the auxiliary antenna 20 as different from the auxiliary antenna 20 shown in FIGS. 5A to 5C.

Figure 6D:
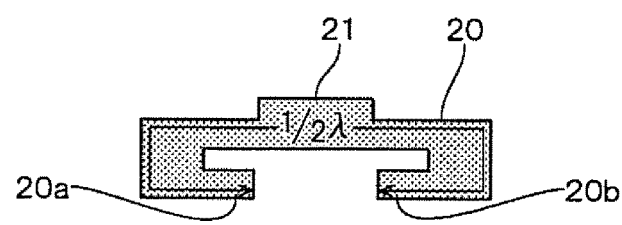

Moreover, in the auxiliary antenna 20 shown in FIG. 6D, both end portions 20a and 20b extended in the direction (downward) crossing the longitudinal direction are further extended toward an antenna center along the longitudinal direction as different from the auxiliary antenna 20 shown in FIG. 6C.

As described above, when the end portions of the auxiliary antenna 20 are extended/bent in the direction crossing the longitudinal direction, a length of the auxiliary antenna 20 extending in the longitudinal direction can be further reduced while keeping the length of the auxiliary antenna 20 in the longitudinal direction to, e.g., substantially the ½ wavelength of the communication radio wave, and the entire length of the RF tag 1 can be decreased.

Additionally, in case of bending the end portions of the auxiliary antenna 20 in this manner, the end portions protruding to the outside of the inlay 10 also protrude in the direction crossing the longitudinal direction of the auxiliary antenna 20, and hence the portions folded back to the back surface side of the inlay 10 are bent along the longitudinal direction of the auxiliary antenna 20 (see later-described FIGS. 8A to 8E).

It is to be noted that, as to such end portions bent in the direction crossing the longitudinal direction of the auxiliary antenna 20 as shown in FIGS. 6C and 6D, at least one of the end portions of the auxiliary antenna 20 can be formed in this manner, or both the end portions of the auxiliary antenna 20 can be configured in this manner.

Figure 6E:
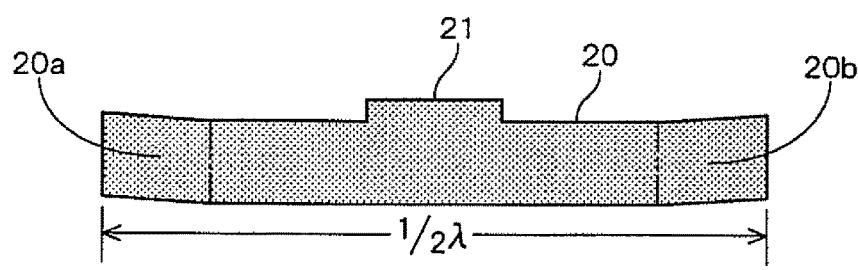

Further, in the auxiliary antenna 20 shown in FIG. 6E, end portions 20a and 20b of the auxiliary antenna 20 in the longitudinal direction longer than the inlay 10 are extended/bent in a direction inclining toward the inlay 10 side (an upper side) from the longitudinal direction of the auxiliary antenna 20 as different from the auxiliary antenna 20 shown in FIGS. 5A to 5C.

With such a configuration, when the end portions 20a and 20b of the auxiliary antenna 20 are folded back to the back surface side, since the end portions 20a and 20b incline toward the inlay 10 side, portions to be folded back are folded back to the inlay 10 side (the upper side) at a slant on the back surface side. Thus, the portions to be folded back do not protrude from the edge portion of the dielectric constant adjusting plate 30 serving as, e.g., the base, and they can be neatly folded back.

It is to be noted that, as to the inclined end portions of the auxiliary antenna 20 shown in FIG. 6E, at least one of the end portions of the auxiliary antenna 20 can be formed in this manner, or both the end portions of the auxiliary antenna 20 may be configured in this manner.

Furthermore, not only the above-described auxiliary antenna 20 but also the inlay 10 with a different shape/configuration or the like can be adopted. Moreover, the shape, the arrangement, or the like of the auxiliary antenna 20 can be changed in correspondence with this adoption.

For example, such inlays 10 or auxiliary antennas 20 as shown in FIGS. 7A to 7D can be adopted.

FIGS. 7A to 7D are plan views showing examples of inlays and auxiliary antennas having different shapes and lamination modes according to one or more embodiments of the present invention, respectively.

Figure 7A:
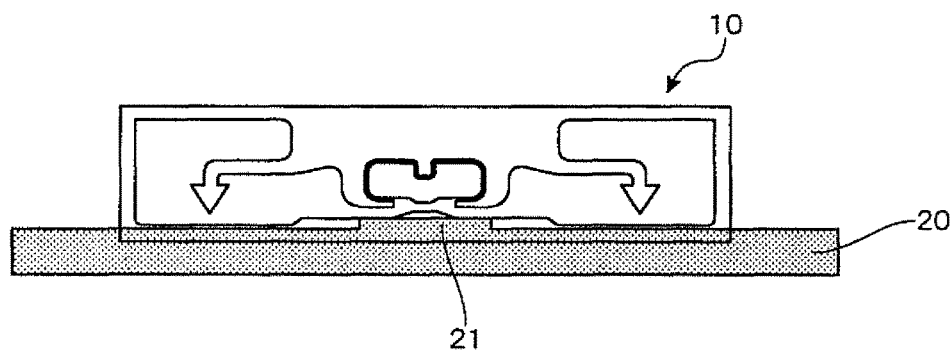
FIGS. 7A to 7D are plan views showing examples where shapes and laminating modes of the inlay and the auxiliary antenna according to one or more embodiments of the present invention are different, respectively.
Figure 7B:
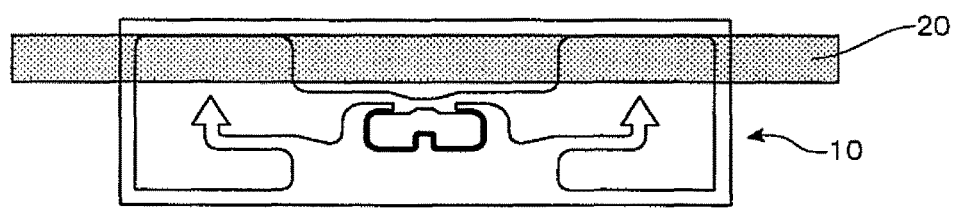
Figure 7C:
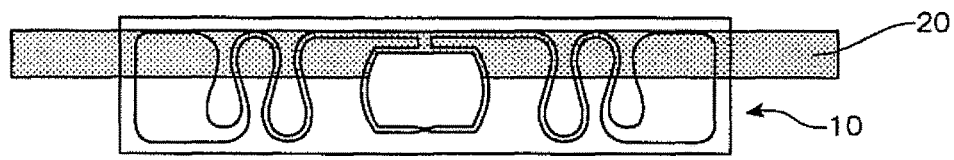
Figure 7D:
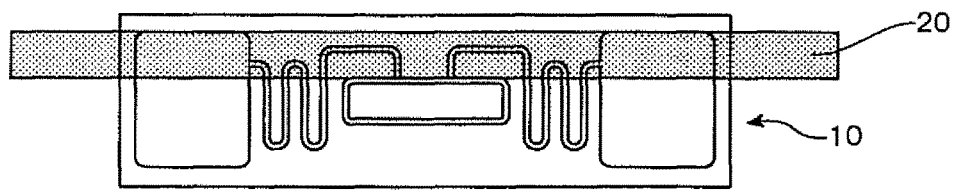

In the examples shown in the drawings, as the inlay 10, for a plurality of types of inlays 10 differing in shape/structure of the antenna 12 or the loop part 11a, as shown in FIG. 7A, an auxiliary antenna 20 having the same protruding portion 21 as that shown in FIGS. 5A to 5C, or as shown in FIG. 7B, a linear strip-like auxiliary antenna 20 which does not have the protruding portion 21, no concave portion/notch or the like is overlapped and arranged on an edge portion (an upper edge or a lower edge) of the inlay 10.

Even if the auxiliary antenna 20 is overlapped and laminated along the longitudinal direction of the inlay 10 in this manner, the antenna 12 of the inlay 10 is allowed to effectively function as long as an exposed area of the antenna 12 of the inlay 10 is assured, and hence this arrangement can be adopted as the configuration of the RF tag 1 according to one or more embodiments the present invention.

[Partial Cut of Inlay/Auxiliary Antenna]

Further, as to the inlay 10 and the auxiliary antenna 20 described above, a part of the inlay 10 can be cut to achieve, e.g., further miniaturization, adjustment/improvement of the communication characteristics of the RF tag 1.

FIGS. 8A to 8E are plan views when one end side in the longitudinal direction of the inlay and the auxiliary antenna of the RF tag according to one or more embodiments of the present invention is cut, where (a) shows the inlay and (b) shows the auxiliary antenna.

Figure 8A:
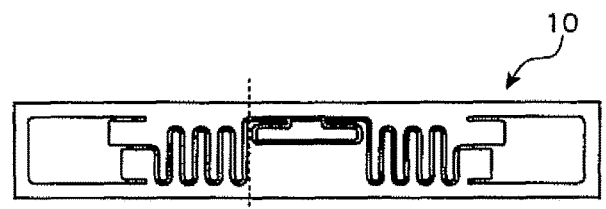
FIGS. 8A to 8E are plan views when one end side of a longitudinal direction of the inlay and the auxiliary antenna of the RF tag according to one or more embodiments of the present invention is cut, where
Figure 8B:
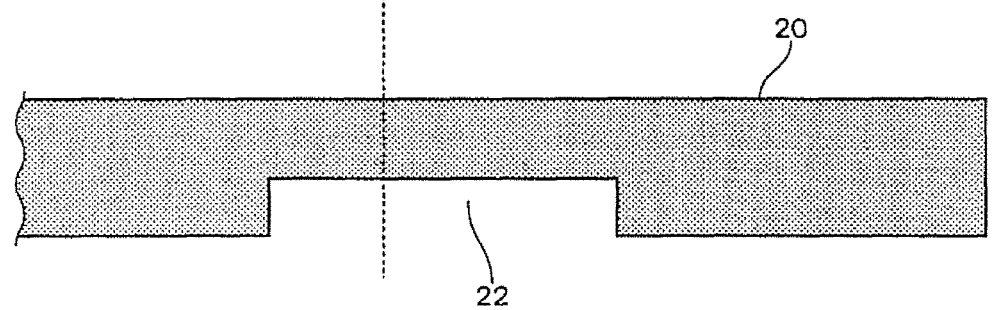

As shown in the drawings, in the inlay 10, a part of the antenna 12 (one side in the longitudinal direction) can be cut at, e.g., a position of a broken line shown in FIGS. 8A and 8B while keeping the loop part 11a.

Furthermore, the auxiliary antenna 20 can be linearly formed along the longitudinal direction longer than the inlay 10, and may include a notch portion 22 through which a part of the loop circuit 11a of the inlay 10 is exposed.

Moreover, a part of the auxiliary antenna 20 (one side in the longitudinal direction) can be cut in correspondence with the cut inlay 10.

With this arrangement, the inlay 10 can be formed to be shorter than its original length in the longitudinal direction. Additionally, when a part of the antenna 12 of the inlay 10 is cut and removed, the bent inlay 10 (the antenna 12) can be prevented from overlapping the back side of the loop portion 11a, and the loop portion 11a can be allowed to effectively function.

Additionally, the entire length of the RF tag 1 can be shorted to the length of the partially cut and shortened inlay 10, and one end or both ends of the auxiliary antenna 20 longer than the inlay 10 can be folded back to the back surface side while assuring the length of the auxiliary antenna 20 in the longitudinal direction which is a predetermined length longer than the inlay 10.

Figure 8C:
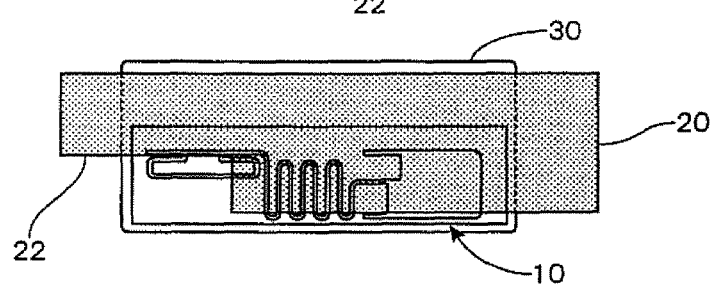
Figure 8D:
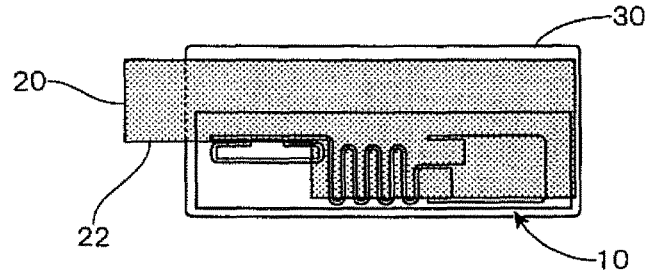
Figure 8E:
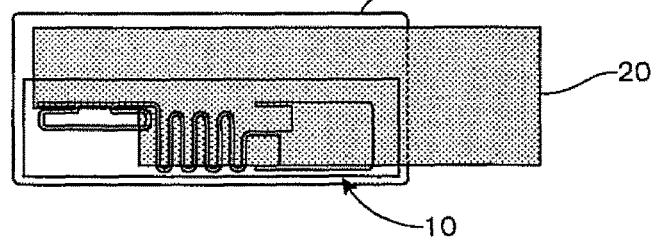

FIGS. 8C to 8E are plan views showing examples of different modes of mounting/laminating the inlay 10 and the auxiliary antenna 20 which are partially cut and shown in FIGS. 8A and 8B on the dielectric constant adjusting plate 30.

As shown in the drawings, the dielectric constant adjusting plate 30 serving as the base has a length which enables mounting the partially cut inlay 10 thereon, and which is a length allowing both ends or one end of the auxiliary antenna 20 to protrude. Thus, both the ends or the one end of the auxiliary antenna 20 protruding from the end portion(s) of the dielectric constant adjusting plate 30 is folded back to the back surface side.

Specifically, in FIG. 8C, both the ends of the auxiliary antenna 20 in the longitudinal direction are protruded from the dielectric constant adjusting plate 30 as portions to be folded back, and both the end portions of the auxiliary antenna 20 are folded back to the back surface side of the inlay 10 (the dielectric constant adjusting plate 30).

On the other hand, one of the end portions of the auxiliary antenna 20 in the longitudinal direction is protruded from the dielectric constant adjusting plate 30 in FIGS. 8D and 8E and, in this case, the end portion of the auxiliary antenna 20 protruded toward the loop part 11a side of the inlay 10 is folded back in FIG. 8D, whilst the end portion of the auxiliary antenna 20 protruded toward the end portion side of the antenna 12 of the inlay 10 is folded back in FIG. 8E.

When the inlay 10 and the auxiliary antenna 20 are partially cut in this manner, the length in the longitudinal direction can be further shortened, and the RF tag 1 can be further miniaturized/shortened.

[Bending Direction of Auxiliary Antenna]

Figure 9A:
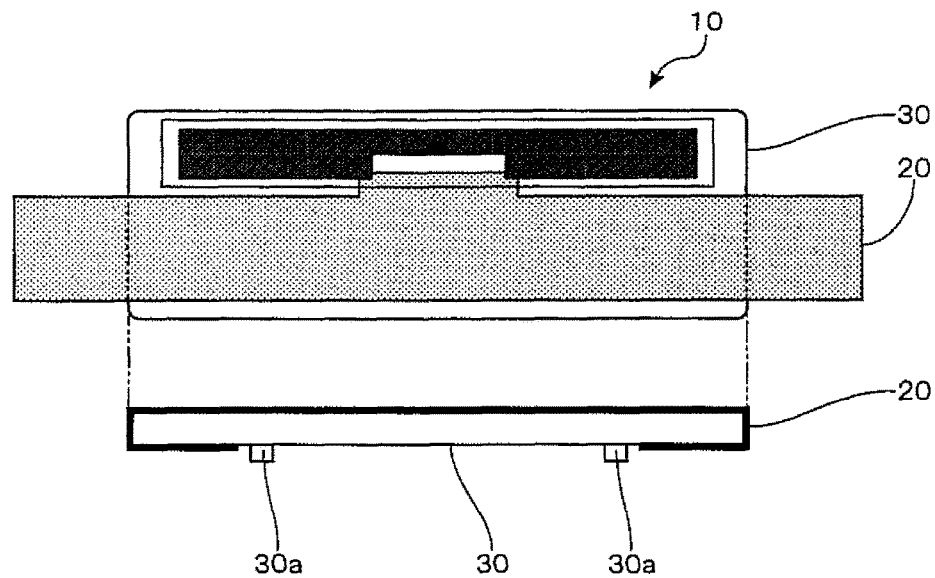
FIG. 9A and FIG. 9B are plan views showing a state where the inlay and the auxiliary antenna of the RF tag according to one or more embodiments of the present invention are laminated on the dielectric constant adjusting plate and end portions of the auxiliary antenna are bent to a back surface side, where
Figure 9B:
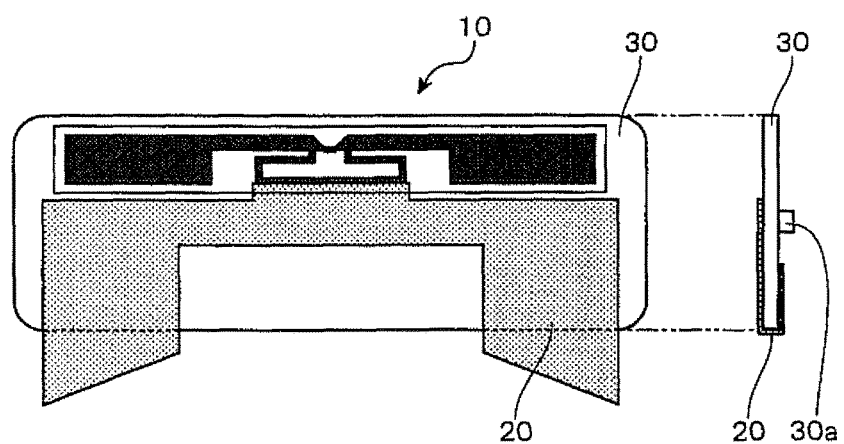

The above-described RF tag 1 can be bent in two directions as bending directions along which the auxiliary antenna 20 formed to be longer than the inlay 10 is folded back to the back surface side as shown in FIGS. 9A and 9B.

First, as shown in FIG. 9A, both ends (or one end) of the auxiliary antenna 20 linearly formed along the longitudinal direction are protruded from the end portions of the inlay 10 (and the dielectric constant adjusting plate 30).

In this case, the end portions (both the ends or the one end) of the auxiliary antenna 20 are bent along the direction crossing the longitudinal direction, and folded back to the back surface side of the inlay 10 (the dielectric constant adjusting plate 30) as shown in FIG. 9A.

On the other hand, as shown in FIG. 9B, in case of the auxiliary antenna 20 having both end portions (or one end portion) in the longitudinal direction bent in the direction crossing the longitudinal direction, both the ends (or the one end) protrude from an edge portion (an upper edge or a lower edge) of the inlay 10 (and the dielectric constant adjusting plate 30) in the longitudinal direction.

In this case, the end portions (both the ends or the one end) of the auxiliary antenna 20 are bent along the longitudinal direction, and folded back to the back surface side of the inlay 10 (the dielectric constant adjusting plate 30) as shown in FIG. 9B.

As described above, as to the bending direction of the auxiliary antenna 20, bending in an appropriate direction can be performed in correspondence with a shape of the auxiliary antenna 20, a protruding direction from the inlay 10 (the dielectric constant adjusting plate 30), or the like.

[Communication Characteristics]

The communication characteristics of the RF tag 1 according to this embodiment having the above-described configuration will now be described with reference to FIGS. 10A to 10C.

FIGS. 10A to 10C are line charts showing the communication characteristics of the RF tag according to one or more embodiments of the present invention and showing a relationship between a communication distance and a frequency, respectively.

First, FIG. 10(A shows a relationship between a communication distance and a frequency of each RF tag 1 including the inlay 10 and the auxiliary antenna 20 which are not partially cut and shown in FIGS. 5A to 5C and FIGS. 6A to 6E.

As shown in the drawing, each of four RF tags 1 can provide a first peak of a communication distance (approximately 5 to 9 m) in a band of 800 to 820 MHz, and this can be achieved by the antenna 12 of the inlay 10.

Further, it can be understood that the four RF tags 1 can provide second peaks of the communication distance (approximately 4 m, 6 to 7 m, 7 to 8 m, and 8 to 9 m) in a band of 860 M to 960 MHz, a band of 900 M to 920 MHz, a band of 940 M to 960 MHz, and a band of 960 M to 980 MHz aside from the peak of the antenna 12 of the inlay 10, respectively. This can be achieved by the auxiliary antenna 20.

On the other hand, each of FIGS. 10B and 10C shows a relationship between a communication distance and a frequency of the RF tag 1 including the partially cut inlay 10 and auxiliary antenna 20 shown in FIGS. 8A to 8E.

As shown in the drawings, it can be understood that, in the RF tag 1 having the partially cut inlay 10 and auxiliary antenna 20, a frequency band can be adjusted to a predetermined range in correspondence with a cutting position of the inlay 10/auxiliary antenna 20, a sizing of an outer shape of the same after cutting, and a sizing of the notch portion 22 provided in the auxiliary antenna 20.

In any case, two peaks of the communication distance can be provided, and a low frequency band is provided by the antenna 12 of the inlay 10 whilst a high frequency band is provided by the auxiliary antenna 20.

As described above, according to the RF tag 1 of this embodiment, the auxiliary antenna 20 is overlapped and arranged on a part of the loop part 11a (the loop circuit) formed of the antenna 12 of the inlay 10, and the other part of the antenna 12 of the inlay 10 is arranged to be extensively exposed without being covered with the auxiliary antenna 20.

Further, the length of the long side (the longitudinal direction) of the auxiliary antenna 20 is set to a length which is substantially ½ of a wavelength of the radio frequency used for the wireless communication, and at least one of the end portions 20a and 20b of the auxiliary antenna 20 larger (longer) than the length of the inlay 10 in the longitudinal direction is bent to the back surface side of the inlay 10.

According to the RF tag 1 having such a configuration, even if the auxiliary antenna 20 is overlapped and laminated on the inlay 10, the auxiliary antenna 20 does not inhibit the impedance matching with the loop part 11a of the inlay 10, the antenna 12 of the inlay 10 is extensively exposed without being covered with the auxiliary antenna 20, and hence the antenna 12 of the inlay 10 itself can be allowed to function as the antenna of the RF tag 1 together with the auxiliary antenna 20.

Consequently, the two antennas, i.e., the antenna 12 of the inlay 10 and the auxiliary antenna 20 can function, and the RF tag 1 can perform the wireless communication over the difference frequency bands with the excellent communication characteristics by using the antenna 12 of the inlay 10 and the auxiliary antenna 20.

In this embodiment, as described above, the planar-ly extended auxiliary antenna 20 can be laminated on the inlay 10 including the IC chip 11 and the antenna 12, these members can be housed in the predetermined housing 50 to be protected from the external environment, and both the antenna 12 of the inlay 10 and the auxiliary antenna 20 can be allowed to effectively function, and the wireless communication over a plurality of different frequency bands can be performed.

Thus, it is possible to realize the RF tag which is suitable for, e.g., an electric meter by which the communication characteristic of the RF tag 1 are easily affected or a freight container which is used over countries or regions using different available frequency bands as the communication frequency of the RF tag 1, and versatility or extensibility of the RF tag can be greatly improved.

Furthermore, changing/adjusting the dielectric constant adjusting plate 30 enables coping with a case where the communication frequency varies due to a change in the IC chip 11 or the antenna 12 constituting the inlay 10 or a case where the inlay 10 constituted of the same IC chip 11 and antenna 12 is used in, e.g., a country or a region where an available communication frequency band is different.

Consequently, in case of using the RF tag 1 for, e.g., a freight container which is carried/used over such countries or regions, replacing the dielectric constant adjusting plate 30 alone enables coping with a plurality of different communication frequencies while using the same housing 50 or inlay 10.

Thus, according to the RF tag 1 of this embodiment, it is possible to avoid changing and remaking all constituent elements of the RF tag and using structures or materials fixedly/dedicatedly correspond with a specific metal article or communication frequency alone like conventional RF tags when the communication frequency, a use mode, a use region, or the like varies. For example, just changing the inlay 10, the auxiliary antenna 20, the dielectric constant adjusting plate 30, or the like housed in the housing 50, and just replacing/changing the dielectric constant adjusting plate 30 enable coping with a case where each of articles using the RF tag 1 or the communication frequency or the use environment of the RF tag 1 varies.

As described above, according to the RF tag 1 of this embodiment, the RF tag 1 adapted to various articles, communication frequencies, use environments, and the like can be provided, an entire manufacturing cost of the RF tag can be reduced, an existing general-purpose inlay can be positively used, the entire tag can be configured at a low cost, and the metal-adaptive RF tag which has excellent versatility and extensibility and provides the excellent communication characteristics at a low cost can be realized.

Although one or more embodiments of the RF tag and the metal container according to the present invention have been described above, the RF tag according to the present invention is not restricted to the foregoing embodiment, and it is needless to say that various changes can be made within a scope of the present invention.

For example, the electric meter and the freight container have been taken as examples and described as the articles using the RF tag according to one or more embodiments of the present invention in the foregoing embodiment, but each of the articles and objects which can use the RF tag according to the present invention is not restricted to the electric meter or the container.

That is, the RF tag according to the present invention can be applied to any articles/objects as long as they are articles/objects which use the RF tag and from/to which predetermined information/data is read/written through the reader/writer.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Contents of the reference literature described in this specification and a specification of a Japanese application which forms a basis for a priority of this application under the Paris convention are cited herein.

One or more embodiments of the present invention can be used as the metal-adaptive RF tag which is attached to each of arbitrary articles and objects, e.g., an electric meter or a freight container and formed into a structure that the inlay or the RF tag is housed/sealed in the housing to enhance light resistance, waterproof properties, and the like.

REFERENCE SIGNS LIST

1 RF tag
10 inlay
11 IC chip
11a loop part
12 antenna
13 sealing film
20 auxiliary antenna
21 protruding portion
22 notch portion
30 dielectric constant adjusting plate
50 housing
51 housing main body
52 lid portion

What is claimed is:

1. An RF tag comprising:
an inlay comprising an IC chip and an antenna;
an auxiliary antenna laminated on the inlay in an insulated state; and
a housing that houses the inlay and the auxiliary antenna laminated thereon, wherein
the antenna of the inlay forms a loop circuit adjacent to the IC chip, and
the auxiliary antenna overlaps part of the loop circuit and is arranged along a longitudinal direction of the inlay such that at least a part of the antenna of the inlay is exposed.

2. The RF tag according to claim 1, wherein
a length of the auxiliary antenna in the longitudinal direction is larger than a length of the inlay in the longitudinal direction, and
at least one end portion of the auxiliary antenna in the longitudinal direction is bent toward a back surface side of the inlay on which the auxiliary antenna is laminated.

3. The RF tag according to claim 2, wherein the auxiliary antenna is linearly formed along the longitudinal direction and comprises a protruding portion that overlaps the loop circuit.

4. The RF tag according to claim 2, wherein the auxiliary antenna is linearly formed along the longitudinal direction and comprises a notch through which a part of the loop circuit is exposed.

5. The RF tag according to claim 1, wherein
a length of the auxiliary antenna in the longitudinal direction is larger than a length of the inlay in the longitudinal direction, and
at least one end portion of the auxiliary antenna in the longitudinal direction extends in a direction crossing the longitudinal direction of the auxiliary antenna.

6. The RF tag according to claim 1, wherein
a length of the auxiliary antenna in the longitudinal direction is larger than a length of the inlay in the longitudinal direction, and
at least one end portion of the auxiliary antenna in the longitudinal direction extends in a direction inclined from the longitudinal direction of the auxiliary antenna.

7. The RF tag according to claim 1, wherein a length of the auxiliary antenna in the longitudinal direction is approximately half of a wavelength of a radio frequency of the inlay.

8. The RF tag according to claim 1, further comprising a base plate, wherein
the inlay is mounted on the base plate,
a length of the auxiliary antenna in the longitudinal direction is larger than a length of the inlay in the longitudinal direction, at least one end portion of the auxiliary antenna in the longitudinal direction is bent toward the back surface side of the base plate, and
the housing further houses the base plate.

* * * * *